United States Patent
Schwartz

(10) Patent No.: US 8,260,044 B2
(45) Date of Patent: Sep. 4, 2012

(54) REDUCING ERRONEOUS COLORS IN EDGE AREAS WITH CHROMATIC ABBERATION

(75) Inventor: Tomer Schwartz, Tel-Aviv (IL)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 251 days.

(21) Appl. No.: 12/831,499

(22) Filed: Jul. 7, 2010

(65) Prior Publication Data

US 2012/0008859 A1   Jan. 12, 2012

(51) Int. Cl.
*G06K 9/00* (2006.01)
*G06K 9/34* (2006.01)

(52) U.S. Cl. .......................................... 382/165

(58) Field of Classification Search ............... 382/128, 382/162, 164, 165, 167, 276; 345/72, 83, 345/88, 589, 597, 598, 690, 694, 695, 904; 348/189, 191, 272, 584, 589, 599, 600, 658; 358/1.9, 406, 450, 500, 515, 518, 523, 527

See application file for complete search history.

(56) References Cited

U.S. PATENT DOCUMENTS

| | | | | |
|---|---|---|---|---|
| 5,296,935 A * | 3/1994 | Bresler | ........................ | 358/406 |
| 5,615,282 A * | 3/1997 | Spiegel et al. | ............... | 382/167 |
| 6,912,004 B1 | 6/2005 | Knudsen et al. | | |
| 6,950,109 B2 * | 9/2005 | Deering | ........................ | 345/589 |
| 7,023,576 B1 | 4/2006 | Jonsson et al. | | |
| 7,283,142 B2 * | 10/2007 | Credelle et al. | ............... | 345/694 |
| 7,755,817 B2 * | 7/2010 | Ho et al. | ....................... | 358/523 |
| 7,929,807 B2 | 4/2011 | Andersen | | |
| 2007/0171290 A1 * | 7/2007 | Kroger | ........................ | 348/272 |
| 2009/0160992 A1 | 6/2009 | Inaba et al. | | |
| 2011/0200240 A1 * | 8/2011 | Van Herpen et al. | ......... | 382/128 |
| 2012/0008859 A1 * | 1/2012 | Schwartz | ..................... | 382/165 |

FOREIGN PATENT DOCUMENTS

| | | |
|---|---|---|
| EP | 1 289 310 A2 | 3/2003 |
| EP | 1 677 548 A2 | 7/2006 |

OTHER PUBLICATIONS

International Search Report received in PCT Patent Application No. PCT/EP2011/061411 dated Sep. 5, 2011 (4 pages).
Written Opinion of International Searching Authority received in PCT Patent Application No. PCT/EP2011/061411 dated Sep. 5, 2011 (7 pages).
Current Claims, PCT Patent Application No. PCT/EP2011/061411 (7 pages), 2011.

* cited by examiner

*Primary Examiner* — Amir Alavi
(74) *Attorney, Agent, or Firm* — Hickman Palermo Truong Becker Bingham Wong LLP

(57) ABSTRACT

A technique is disclosed for calculating a value for a second color for a particular pixel. The technique selects a first set of neighboring pixels situated on a first side of the particular pixel, and a second set of neighboring pixels situated on an opposite side of the particular pixel. Based upon color values from the first set of neighboring pixels, the technique determines a first representative relationship, and based upon color values from the second set of neighboring pixels, the technique determines a second representative relationship. Based upon these representative relationships, the technique determines a target relationship between the value for the second color for the particular pixel and a value for a first color for the particular pixel. Based upon the target relationship and the value for the first color for the particular pixel, the technique calculates the value for the second color for the particular pixel.

22 Claims, 7 Drawing Sheets

Fig. 1

| $G_1$ | $R_2$ | $G_3$ | $R_4$ | $G_5$ |
|---|---|---|---|---|
| $B_6$ | $G_7$ | $B_8$ | $G_9$ | $B_{10}$ |
| $G_{11}$ | $R_{12}$ | $G_{13}$ | $R_{14}$ | $G_{15}$ |
| $B_{16}$ | $G_{17}$ | $B_{18}$ | $G_{19}$ | $B_{20}$ |
| $G_{21}$ | $R_{22}$ | $G_{23}$ | $R_{24}$ | $G_{25}$ |

*Fig. 4A*

| $G_1$ | $B_2$ | $G_3$ | $B_4$ | $G_5$ |
|---|---|---|---|---|
| $R_6$ | $G_7$ | $R_8$ | $G_9$ | $R_{10}$ |
| $G_{11}$ | $B_{12}$ | $G_{13}$ | $B_{14}$ | $G_{15}$ |
| $R_{16}$ | $G_{17}$ | $R_{18}$ | $G_{19}$ | $R_{20}$ |
| $G_{21}$ | $B_{22}$ | $G_{23}$ | $B_{24}$ | $G_{25}$ |

*Fig. 4B*

| R₁ | G₂ | R₃ | G₄ | R₅ |
|---|---|---|---|---|
| G₆ | B₇ | G₈ | B₉ | G₁₀ |
| R₁₁ | G₁₂ | R₁₃ | G₁₄ | R₁₅ |
| G₁₆ | B₁₇ | G₁₈ | B₁₉ | G₂₀ |
| R₂₁ | G₂₂ | R₂₃ | G₂₄ | R₂₅ |

*Fig. 4C*

| B₁ | G₂ | B₃ | G₄ | B₅ |
|---|---|---|---|---|
| G₆ | R₇ | G₈ | R₉ | G₁₀ |
| B₁₁ | G₁₂ | B₁₃ | G₁₄ | B₁₅ |
| G₁₆ | R₁₇ | G₁₈ | R₁₉ | G₂₀ |
| B₂₁ | G₂₂ | B₂₃ | G₂₄ | B₂₅ |

*Fig. 4D*

REDUCING ERRONEOUS COLORS IN EDGE AREAS WITH CHROMATIC ABBERATION

BACKGROUND

Many of today's digital video devices (e.g. digital cameras, digital video recorders, etc.) employ a mosaicing/demosaicing process to capture and to reproduce a color image. In the mosaicing process, a color image is captured using a color filter array (CFA) and an array of optical sensors that is overlaid by the CFA. The CFA has a plurality of filter elements, each of which overlays one of the optical sensors in the optical sensor array, and each filter element is designed to pass only one color of light. The most common type of CFA is the Bayer pattern filter (also referred to as a Bayer filter), an example of which is shown in FIG. 1. The Bayer filter comprises filter elements that pass three different colors of light: green (G), blue (B), and red (R). These filter elements are arranged in alternating rows of green-blue and red-green. With this pattern, red and blue filter elements appear on every other row and every other column, while green filter elements appear on every row and every column. This pattern exploits the human eye's higher sensitivity to green light.

As noted, each filter element passes light of only one color. Thus, in the Bayer filter of FIG. 1, filter element $G_1$ passes only green light, filter element $B_2$ passes only blue light, and filter element $R_9$ passes only red light. This means that the optical sensor behind filter element $G_1$ senses only the green portion of the light that hits filter element $G_1$, the optical sensor behind filter element $B_2$ senses only the blue portion of the light that hits filter element $B_2$, and the optical sensor behind filter element $R_6$ senses only the red portion of the light that hits filter element $R_9$. Thus, because of the Bayer filter, the output of each optical sensor will provide information on only one of the three colors.

After capturing an image through the Bayer filter, the array of optical sensors outputs a plurality of values. Each value comes from one of the optical sensors, and each value corresponds to a particular pixel of the image (each optical sensor represents a pixel). Since each pixel corresponds to one of the optical sensors, and since each optical sensor corresponds to one of the filter elements of the Bayer filter, each pixel in turn corresponds to one of the filter elements of the Bayer filter. Thus, using the example of FIG. 1, pixel 1 corresponds to filter element $G_1$, pixel 2 corresponds to filter element $B_2$, pixel 64 corresponds to filter element $G_{64}$, and so on.

For each pixel, only one of the three color values is provided by the optical sensor array. This color value will be referred to herein as the sensed color value. In the example of FIG. 1, the color value provided by the optical sensor array for pixel 1 is the green color value. Thus, green is the sensed color value for pixel 1; hence, pixel 1 is referred to as a green pixel. Similarly, the sensed color value for pixel 2 is blue; thus, pixel 2 is referred to as a blue pixel.

In order to render a pixel in full color, a color value is needed for all three colors. Since only one sensed color value is provided by the sensor array for each pixel, the other two color values need to be calculated for each pixel, which means that for each pixel, there is one sensed color value and two calculated color values. Deriving the two calculated color values for each pixel is the purpose of the demosaicing process.

Often, a color value for a pixel is calculated by way of linear approximation using the sensed color values of neighboring pixels. For example, to determine the blue color value for red pixel $R_{29}$ of FIG. 1, linear approximation may be carried out using the sensed blue color values of neighboring blue pixels $B_{20}$, $B_{22}$, $B_{36}$, and $B_{38}$. Similarly, to determine the green color value for red pixel $R_{29}$, linear approximation may be performed using the sensed green color values of neighboring green pixels $G_{21}$, $G_{28}$, $G_{30}$, and $G_{37}$.

The linear approximation technique is based on the assumption that a pixel should have a calculated color value that is close to the corresponding sensed color values of neighboring pixels. This assumption holds true for most portions of an image; however, for certain areas, it begins to break down. One area in which this assumption breaks down is at an edge area in which there is exhibited some chromatic aberration. As used herein, the term edge area refers to an area of transition in an image in which there is a sharp change or discontinuity in image color or brightness. This may occur, for example, in an area of an image in which there is a transition from one object to another (e.g. the edge between a person's body in the foreground and a house in the background). Chromatic aberration refers to spurious colors that are caused by imperfections in one or more lenses that are used to focus an image onto the CFA. Chromatic aberration is most often manifested near edge areas; thus, in such edge areas, the lens(es) cause(s) spurious colors to be directed at some of the optical sensors, which in turn cause the optical sensors to sense certain colors that do not accurately reflect the actual colors of the image being captured.

It has been observed that if linear approximation is applied to an edge area in which there is chromatic aberration, it leads to the generation of erroneous and illogical color values. Such aberrant color values can lead to undesirable effects in the demosaiced image such as purpling, fringing, etc., which exacerbate the chromatic aberration that is already present in the edge area. Because of this, it is not desirable to use linear approximation in such circumstances. An improved demosaicing technique is thus needed to address this and other scenarios.

BRIEF DESCRIPTION OF THE DRAWINGS

Figure 1:
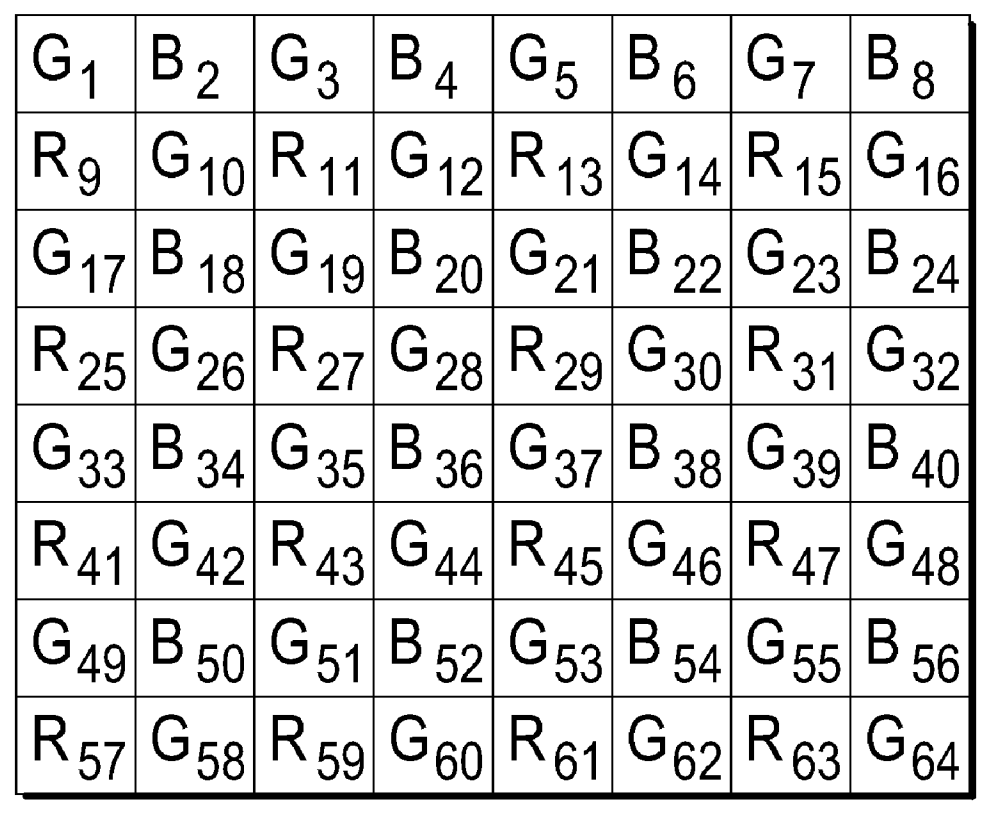

FIG. 1 depicts a sample Bayer pattern filter as an example of a color filter array.

FIGS. 4A-4D illustrate sample pixel arrays that can be used to calculate color values for particular pixels.

DETAILED DESCRIPTION OF EMBODIMENT(S)

Overview

In accordance with one embodiment of the present invention, there is provided an improved technique for calculating color values during the demosaicing process which enables improved results to be achieved in edge areas with chromatic aberration. While this technique is particularly effective in such edge areas, it should be noted that its application is not so limited. Rather, this technique may be used to calculate color values for pixels located in any portion of an image.

In one embodiment, the technique implements two fundamental concepts. First, in calculating a value for a color of interest for a particular pixel, the technique takes into account not just the color values of neighboring pixels that are of the same color as the color of interest but also the color values of neighboring pixels that are of a second color. For example, if the particular pixel has a known green color value and it is desired to calculate a blue color value for the particular pixel, the technique takes into account not just the sensed blue color values of neighboring blue pixels but also the sensed green color values of neighboring green pixels.

Another fundamental concept implemented by the technique is that the neighboring pixels are not all lumped together but rather are separated into multiple sets. A first set of neighboring pixels includes pixels that are situated on a first side of the particular pixel, and a second set of neighboring pixels includes pixels situated on a second and opposite side of the particular pixel. Each set of neighboring pixels is processed separately. By separating the neighboring pixels into multiple sets on opposite sides of the particular pixel, it is possible to better discern edges and to handle them appropriately.

Figure 2:
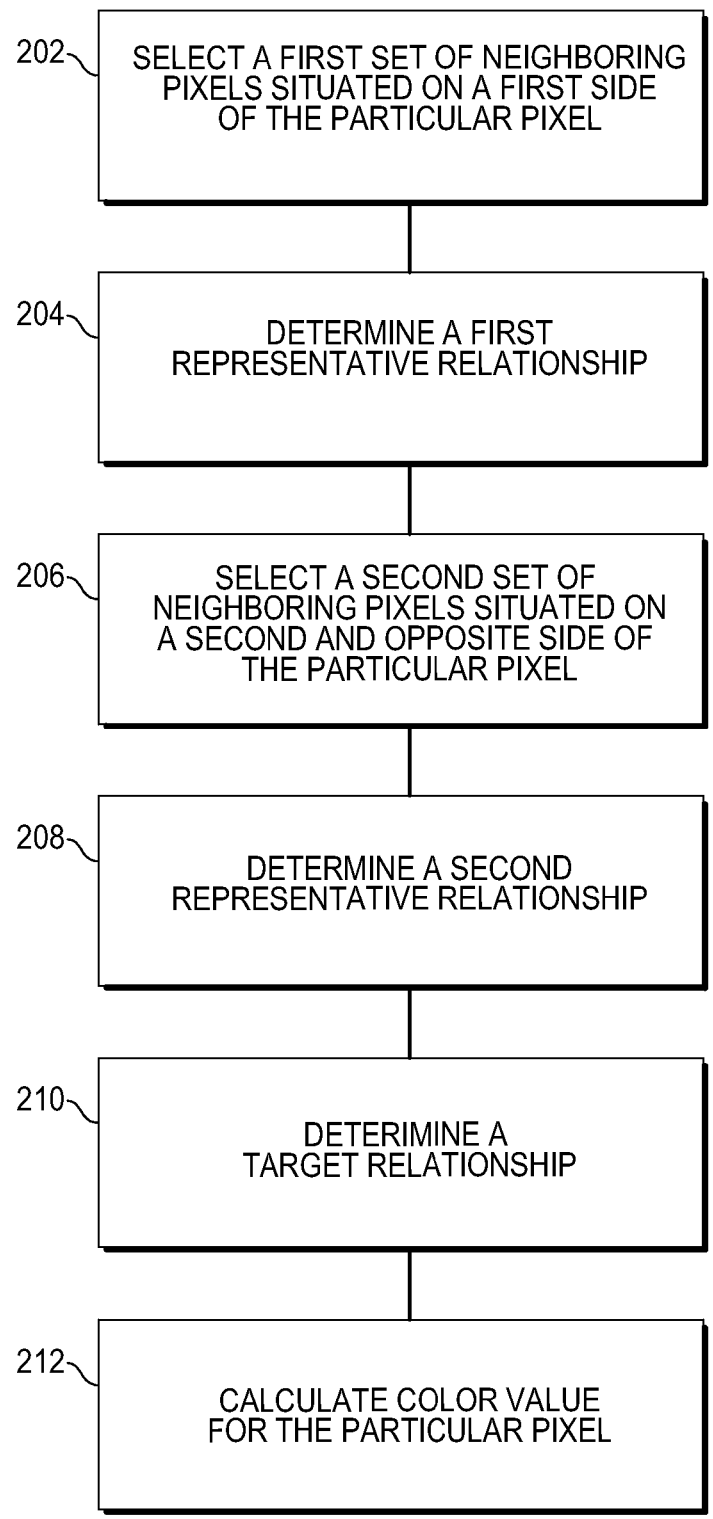
FIG. 2 is a flow diagram for a color value calculation technique in accordance with one embodiment of the present invention.

With these fundamental concepts in mind, an embodiment of the technique will now be described with reference to the flow diagram shown in FIG. 2. The technique of FIG. 2 is intended to calculate a color value for a particular pixel, wherein the particular pixel is part of a matrix of pixels, and wherein the particular pixel has a known value for a first color but does not have a value for a second color. Thus, the object of the technique is to calculate the value for the second color for the particular pixel. For purposes of the technique, the known value for the first color may be a sensed color value that is provided by an optical sensor, or it may be a calculated color value which was previously calculated based upon the sensed color value.

To calculate the value for the second color for the particular pixel, the technique initially selects (block 202) a first set of neighboring pixels that are situated on a first side of the particular pixel. This first side may, for example, be to the left or right of the particular pixel, or it may be above or below the particular pixel, or it may be to the left or right of a diagonal line of pixels that includes the particular pixel. The first set of neighboring pixels comprises a first subset of pixels that has one or more values for the first color and a second subset of pixels that has one or more values for the second color.

Based upon the one or more values for the first color from the first subset of pixels and the one or more values for the second color from the second subset of pixels, the technique determines (block 204) a first representative relationship between the values for the second color and the values for the first color for the first set of neighboring pixels. In one embodiment, this first representative relationship takes the form of a first representative ratio. This first representative ratio may be derived, for example, by dividing the sum of the values for the second color (from the second subset of pixels) by the sum of the values for the first color (from the first subset of pixels) and applying one or more compensating weighting factors.

The technique proceeds to select (block 206) a second set of neighboring pixels that are situated on a second side of the particular pixel which is opposite the first side. The second set of neighboring pixels comprises a third subset of pixels having one or more values for the first color and a fourth subset of pixels having one or more values for the second color.

Based upon the one or more values for the first color from the third subset of pixels and the one or more values for the second color from the fourth subset of pixels, the technique determines (block 208) a second representative relationship between the values for the second color and the values for the first color for the pixels in the second set of neighboring pixels. In one embodiment, this second representative relationship takes the form of a second representative ratio. This second representative ratio may be derived, for example, by dividing the sum of the values for the second color (from the fourth subset of pixels) by the sum of the values for the first color (from the third subset of pixels) and applying one or more compensating weighting factors. In one embodiment, the first and second representative relationships are separate relationships that are determined separately.

Based upon the first and second representative relationships, the technique determines (block 210) a target relationship between the value for the second color for the particular pixel and the value for the first color for the particular pixel. In one embodiment, this target relationship takes the form of a target ratio, which is determined based upon the first and second representative ratios such that the target ratio is between the first representative ratio and the second representative ratio. In one embodiment, the target ratio is the average of the first and second representative ratios.

Based upon the target relationship and the value for the first color for the particular pixel, the technique calculates (block 212) the value for the second color for the particular pixel. In one embodiment, the value for the second color for the particular pixel is calculated such that the value for the second color for the particular pixel and the value for the first color for the particular pixel satisfy the target ratio.

In the manner described above, the value for the second color can be calculated for the particular pixel. When the calculated values for a pixel are derived in this manner, significant improvement can be achieved in many areas of a demosaiced image, especially in edge areas in which chromatic aberration is exhibited.

Apparatus Description

Figure 3:
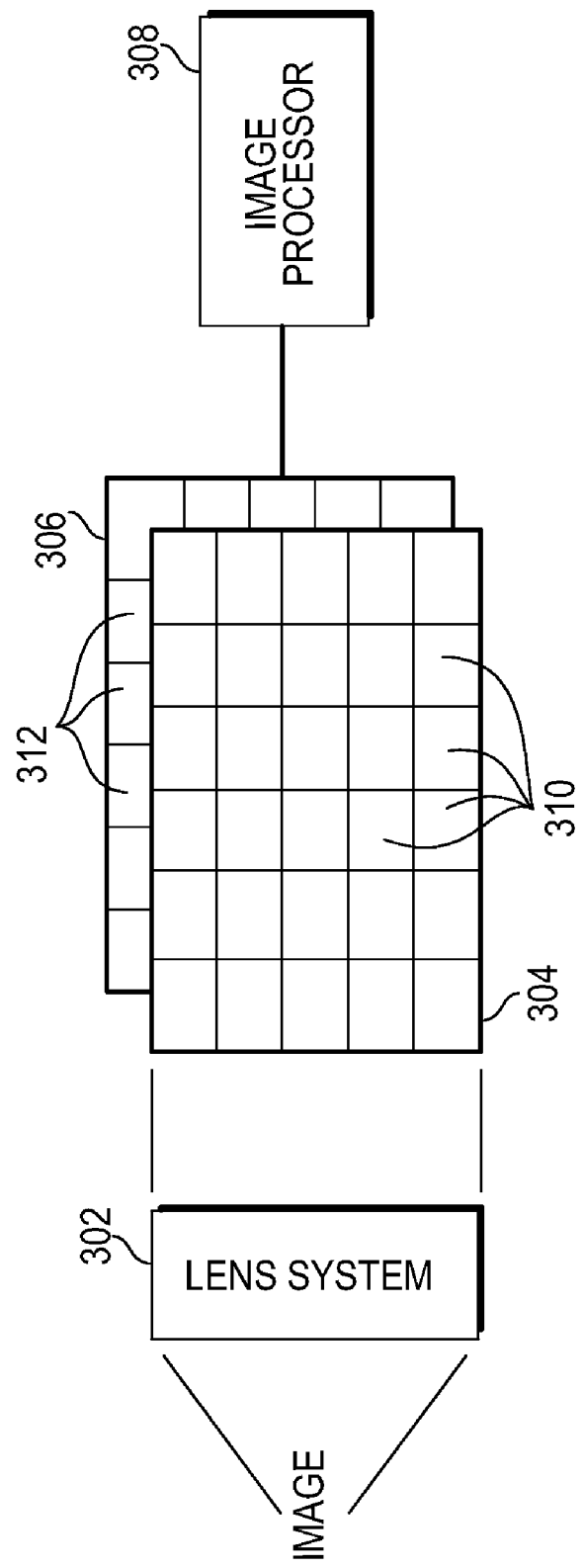
FIG. 3 is a diagram of an apparatus in which one embodiment of the present invention may be implemented.

With reference to FIG. 3, there is shown one possible apparatus in which an embodiment of the present invention may be implemented. As shown, the apparatus comprises a lens system 302, a CFA 304, an optical sensor array 306, and an image processor 308.

The lens system 302 receives light from an image to be captured and focuses the light onto the CFA 204. For purposes of the present invention, the lens system 302 may be a simple lens system consisting of just one lens, or it may comprise multiple lenses that work in conjunction with each other. The lens system 302 may be made of any type of suitable lens material, including but not limited to glass and plastic. Furthermore, the lens system 302 may be a low cost system that exhibits chromatic aberration. Overall, the apparatus of FIG. 3 can tolerate a lower cost, lower quality lens system.

The light focused by the lens system 302 is directed at the CFA 304. In one embodiment, the CFA 304 comprises a plurality of filter elements 310 arranged in rows and columns, with each filter element 310 designed to pass light of a particular color. In one embodiment, the CFA 304 takes the form of a Bayer pattern filter; however, this is not required. For purposes of the present invention, the CFA 304 may be any type of color filter array that uses any set of color filters arranged in any desired pattern.

The light passed through the CFA 304 is detected by the optical sensor array 306. In one embodiment, the optical sensor array 306 comprises a plurality of optical sensor elements 312 arranged in rows and columns that correspond to the rows and columns of filter elements 310 of the CFA 304.

Thus, each sensor element 312 is overlaid by a corresponding filter element 310. For purposes of the present invention, the sensor elements 312 may be implemented with any known technology including, but not limited to, charge coupled devices (CCDs).

Together, the CFA 304 and the optical sensor array 306 operate to capture a mosaiced version of the image. Specifically, in response to detecting light passed through a corresponding filter element 310, each sensor element 312 provides an output value. This output value indicates the amount of light that was detected by that sensor element 312. Since each sensor element 312 (because of the CFA 304) detects light of only one color, this output value will reflect the intensity of just that color. Thus, the output values provided by the entire array of optical sensors 306 will be a collection of single color values (referred to herein as sensed color values), each of which reflects the intensity of just one of several possible colors. As a result, the output of the optical sensor array 306 is a mosaiced version of the original image. In one embodiment, each optical sensor element 312 represents one of the pixels of the image. This means that, for its corresponding pixel, each optical sensor element 312 provides a color value for just one of the colors needed to reconstruct that pixel.

The sensed color values provided by the optical sensor array 306 are received by the image processor 308. Since only one color value is provided by the sensor array 306 for each pixel, the other color values need to be calculated for each pixel. The calculation of these other color values is performed by the image processor 308 as part of a demosaicing process. In one embodiment, it is the image processor 308 that implements the color calculation technique described herein. For purposes of the present invention, the image processor 308 may be implemented using any known technology. For example, the image processor 308 may be hardware implemented using a device (e.g. a programmable logic array) having an array of logical elements wherein the logical elements are programmed/configured to implement the technique described herein. As an alternative, the image processor 308 may be hardware implemented by way of another device such as an application specific integrated circuit (ASIC) having logical elements that are constructed/configured to implement the technique described herein. As a further alternative, the image processor 308 may be software implemented such that the technique described herein is set forth in a set of instructions which are stored in a machine readable storage medium and executed by one or more computing devices (such as the sample computer system shown in FIG. 5) to carry out the technique described herein. These and other implementations are possible. All possible implementations are within the scope of the present invention.

The apparatus of FIG. 3 may be incorporated into a variety of devices to enable those devices to have image capturing and processing capability. These devices may include, for example, mobile communication devices (e.g. cellular phones, smart phones, etc.), personal digital assistants, audio/video capture devices (e.g. cameras, video recorders, etc.), as well as a myriad of other devices. An example of a mobile communication device in which the apparatus of FIG. 3 may be incorporated is shown in FIG. 6.

Figure 6:
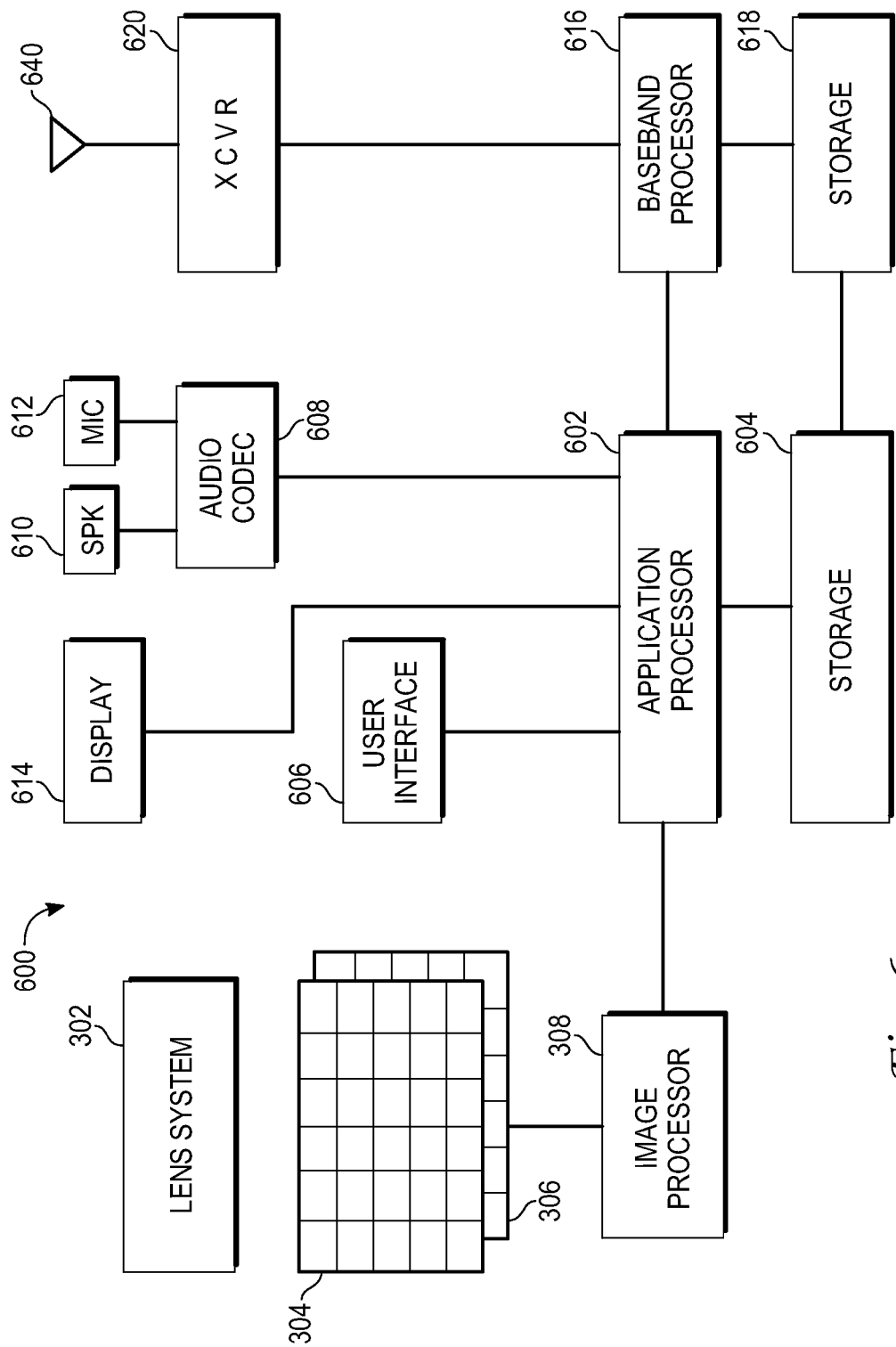
FIG. 6 is a block diagram of a sample mobile communication device in which one embodiment of the present invention may be implemented.

In addition to lens system 302, CFA 304, optical sensor array 306, and image processor 308, the mobile communication device 600 of FIG. 6 further comprises an application processor 602, which is coupled to the image processor 308. The application processor 602 is further coupled to various other components, including storage 604, user interface 606, display 614, and audio codec 608. In one embodiment, it is the application processor 602 that provides most of the non-wireless communication functionality of the device 600. In performing its functions, the application processor 602 executes one or more programs (not shown) stored in storage 604. These programs may include an operating system, which is executed by application processor 602 to provide the basic functions required by the hardware and software components of the device 600. These programs may further include other programs (e.g. games, tools, social networking programs, utilities, navigation programs, browsing programs, etc.) that enable the application processor 602 to provide additional functionality. Storage 604 may store any type of program to enable the application processor 602 to provide any type of functionality. In addition to storing programs, the storage 604 may also be used by the application processor 602 to store temporary information/data that is used by the application processor 602 during program execution.

During operation, the application processor 602 interacts with the user interface 606 to receive input from a user. The user interface 606 may include, for example, a touch sensitive screen, a cursor control device, a keyboard/keypad (physical or virtual), and various other devices that allow the user to provide input. To provide visual output to the user, the application processor 602 is coupled to the display 614. Display 614 may be an LCD screen, an LED screen, or any other type of display that allows the user to view visual output in the form of text, web pages, video, etc.

The application processor 602 is also coupled to the audio codec 608 to enable the user to provide audio input to the device 600 and to enable the application processor to provide audio output to the user. The audio codec 608 receives analog audio input from the user through microphone 612 and transforms the analog audio input into digital audio signals that can be processed by the application processor 602. In addition, the codec receives digital audio signals from the application processor 602 and transforms them into analog audio signals that can be played by the speaker 610 to the user.

The application processor 602 may further be coupled to a baseband processor 616, which in turn is coupled to a second storage 618 and a transceiver 620. In one embodiment, the baseband processor 616 is responsible for performing most of the wireless communication functions of the mobile communication device 600. In doing so, the baseband processor 616 executes one or more programs (not shown) stored in the second storage 618. These programs may include an operating system (which may be the same or different operating system as that executed by the application processor 602), programs for processing incoming communication signals, program for processing outgoing communication signals, and various other programs. In addition to storing programs, the storage 618 may also be used by the baseband processor 616 to store temporary information/data that is used by the baseband processor 616 during program execution.

In processing wireless communication signals, the baseband processor 616 interacts with the transceiver 620. The transceiver 620 receives incoming wireless communication signals through antenna 640 and transforms them into digital signals that can be processed by the baseband processor 616. In addition, the transceiver 620 receives digital signals from the baseband processor 616 and transforms them into signals that can be sent out wirelessly through antenna 640.

In wireless communication device 600, the application processor 602 acts as the central interface for integrating the image processor 308 and the baseband processor 616 with the other components in the device 600. For example, the application processor 602 receives the image information processed by the image processor 308 and allows it to be displayed on display 614. The application processor 602 also allows the image information to be stored in storage 604. In addition, the application processor 602 receives digital communication signals from the baseband processor 616 and allows it to be sent to the speaker 610 to be played to the user. Furthermore, the application processor 602 allows audio input provided by the user through microphone 612 to be sent to the baseband processor 616 for further processing and subsequent transmission.

In previous discussion, it was stated that, in one embodiment, it is the image processor 308 that implements the color calculation technique described herein. It should be noted that this is just one possible embodiment. As alternative embodiments, the technique disclosed herein may be implemented: (1) entirely by the application processor 602; (2) partially by the image processor 308 and partially by the application processor 602; or (3) partially by the image processor 308, partially by the application processor 602, and partially by the baseband processor 616. These and other implementations are possible. All such implementations are within the scope of the present invention.

Specific Examples

To illustrate how the technique in accordance with one embodiment of the present invention may be applied to calculate color values for a particular pixel, several specific examples will now be described. In the following examples, it will be assumed that the CFA used is a Bayer filter, and that the colors to be sensed/determined are green, blue, red. However, it should be noted that this is for illustrative purposes only. If so desired, the technique may be used with other CFAs and other color combinations. Also, in the follow discussion, the general approach used is to calculate a vertical value and a horizontal value for each color for which a color value is to be calculated. After the vertical and horizontal values are calculated, a vertical-horizontal selection scheme is used to determine whether to use one or the other, or both, of the values to arrive at the final color value for that color for the particular pixel. With regard to the vertical-horizontal selection scheme, a number of schemes are currently known. These include the schemes described in:

(1) U.S. Pat. No. 5,629,734, issued to J. F. Hamilton and J. E. Adams, entitled "Adaptive color plane interpolation in single sensor color electronic camera";
(2) U.S. Pat. No. 5,373,322, issued to L. Laroche and M. Prescott, entitled "Apparatus and method for adaptively interpolating a full color image utilizing chrominance gradients";
(3) E. Chang, S. Cheung and D. Y. Pan, "Color filter array recovery using a threshold based variable number of gradients", Proc. SPIE, vol. 3650, pages 36-43 (1999); and
(4) K. Hirakawa and T. W. Parks, "Adaptive homogeneity-Directed Demosaicing Algorithm", IEEE TIP, vol. 14, no. 3, pages 360-369 (2005).

All four of these documents are incorporated in their entirety herein by reference. For purposes of the present invention, any desired vertical-horizontal selection scheme, including these or other schemes, may be used.

Calculating Color Values for a Green Pixel

For a green pixel (a pixel for which a green sensed color value is received from the optical sensor array 306), the color values that need to be calculated are the red and blue color values. A green pixel may be found in a matrix of pixels in one of two arrangements, shown in FIGS. 4A and 4B. In both FIGS. 4A and 4B, the particular pixel for which the blue and red color values are to be calculated is the center pixel 13. However, in FIG. 4A, the center pixel has a red pixel to its left and right, and a blue pixel on top and bottom, but in FIG. 4B, the center pixel has a blue pixel to its left and right, and a red pixel on top and bottom. These arrangements are handled slightly differently. The arrangement shown in FIG. 4A will be addressed first.

FIG. 4A shows a 5×5 matrix of pixels surrounding a particular pixel (the center pixel) for which color values are to be calculated. With regard to nomenclature, the R, G, and B indicate the color of the sensed color value that is received from the optical sensor array 306 for that pixel. Thus, for pixel 1, green is the sensed color value received from the sensor array; for pixel 2, red is the sensed color value received from the sensor array; and for pixel 6, blue is the sensed color value received from the sensor array. The subscripted number of each pixel indicates the order of that pixel relative to the other pixels in the 5×5 array. Thus, the subscript 13 for the center pixel indicates that the center pixel is the 13th pixel in the 5×5 array. This number has nothing to do with the order in which the green color value for that pixel was received from the sensor array 306. For example, the value for the center pixel may have been the 596th value received from the sensor array. These pixel numbers are used for ease of reference only. Together, the R/G/B designation and the subscript refer to a color value for a particular pixel. Thus, $G_{13}$ refers to the green color value for pixel 13 in the 5×5 matrix. Likewise, $R_{14}$ refers to the red color value for pixel 14 in the 5×5 matrix, and $B_8$ refers to the blue color value for pixel 8 in the 5×5 matrix. With this nomenclature in mind, an example of how the red and blue color values may be calculated for the green center pixel 13 will now be described.

Calculating a Red Color Value

In the arrangement shown in FIG. 4A, it is noted that there are red color values ($R_{12}$ and $R_{14}$) and green color values ($G_{11}$, $G_{13}$, and $G_{15}$) in the center row of pixels in which the center green pixel 13 is situated. Thus, the horizontal red color value for the green center pixel 13 can be calculated using these color values. One possible equation for calculating the horizontal red color value for pixel 13 is shown in Eq. 1.

$$R_h = G_{13} \cdot \frac{3(R_{12} + R_{14})}{2(G_{11} + G_{13} + G_{15})} \quad \text{Eq. 1}$$

In effect, this equation takes the sum of the red color values $R_{12}$ and $R_{14}$ and divides it by the sum of the green color values $G_{11}$, $G_{13}$, and $G_{15}$, adjusted by some weighting factors (the weighting factors of 3 and 2 are used to compensate for the fact that there are three green color values but only two red color values). The result is a representative ratio between the red color values and the green color values for the center row of pixels. This ratio is used as the target ratio between the horizontal red value for pixel 13 (to be calculated) and the green color value $G_{13}$ for pixel 13. The horizontal red color value for pixel 13 is then derived by multiplying this ratio by the green color value $G_{13}$ for pixel 13.

With regard to the vertical red color value for pixel 13, it is noticed that the center column of pixels in which the center pixel 13 is situated does not contain any red color values (that column contains only blue and green color values). Thus, the vertical red color value for pixel 13 cannot be derived from these values. However, it is noticed that in the column of pixels to the left and right of the center pixel 13, there are red and green color values. Hence, these color values can be used to calculate the vertical red color value for pixel 13. One possible equation for calculating the vertical red color value for pixel 13 is shown in Eq. 2.

$$R_v = G_{13} \cdot \frac{1}{2}\left[\frac{2(R_2 + R_{12} + R_{22})}{3(G_7 + G_{17})} + \frac{2(R_4 + R_{14} + R_{24})}{3(G_9 + G_{19})}\right] \quad \text{Eq. 2}$$

In effect, this equation performs the following functions. First, it selects a first set of neighboring pixels situated on one side of the center pixel 13. In this example, the first side is the left side and the first set of neighboring pixels is pixels 2, 7, 12, 17, and 22. This set of neighboring pixels comprises a first subset of pixels (pixels 2, 12, and 22) with red color values $R_2$, $R_{12}$, and $R_{22}$, and a second subset of pixels (pixels 7 and 17) with green color values $G_7$ and $G_{17}$. The equation takes the sum of the red color values $R_2$, $R_{12}$, and $R_{22}$ and divides it by the sum of the green color values $G_7$ and $G_{17}$, adjusted by some weighting factors (the weighting factors of 3 and 2 are used to compensate for the fact that there are three red color values but only two green color values). The result is a first representative ratio between the red color values and the green color values for the pixels in the first set of neighboring pixels.

The equation also selects a second set of neighboring pixels situated on a second and opposite side of the center pixel 13. In this example, the second and opposite side is the right side and the second set of neighboring pixels is pixels 4, 9, 14, 19, and 24. This set of neighboring pixels comprises a first subset of pixels (pixels 4, 14, and 24) with red color values $R_4$, $R_{14}$, and $R_{24}$, and a second subset of pixels (pixels 9 and 19) with green color values $G_9$ and $G_{19}$. The equation takes the sum of the red color values $R_4$, $R_{14}$, and $R_{24}$ and divides it by the sum of the green color values $G_9$ and $G_{19}$, adjusted by some weighting factors (the weighting factors of 3 and 2 are used to compensate for the fact that there are three red color values but only two green color values). The result is a second representative ratio between the red color values and the green color values for the pixels in second set of neighboring pixels.

The equation then averages the first and second representative ratios and sets this average ratio as the target ratio between the vertical red value for pixel 13 (to be calculated) and the green color value $G_{13}$ for pixel 13. The vertical red color value for pixel 13 is then derived by multiplying this target ratio by the green color value $G_{13}$ for pixel 13.

In the manner described, the horizontal and vertical red color values for pixel 13 can be calculated. Once these red color values are calculated, a desired horizontal-vertical selection scheme is applied, and one or both of the red color values are used to derive a final and overall red color value $R_{13}$ (not shown in FIG. 4A) for pixel 13.

Calculating a Blue Color Value

A similar methodology may be used to calculate a blue color value for pixel 13. In the arrangement shown in FIG. 4A, it is noted that there are blue color values ($B_8$ and $B_{18}$) and green color values ($G_3$, $G_{13}$, and $G_{23}$) in the center column of pixels in which the center green pixel 13 is situated. Thus, the vertical blue color value for center pixel 13 can be calculated using these color values. One possible equation for calculating the vertical blue color value for pixel 13 is shown in Eq. 3.

$$B_v = G_{13} \cdot \frac{3(B_8 + B_{18})}{2(G_3 + G_{13} + G_{23})} \quad \text{Eq. 3}$$

In effect, this equation takes the sum of the blue color values $B_8$ and $B_{18}$ and divides it by the sum of the green color values $G_3$, $G_{13}$, and $G_{23}$, adjusted by some weighting factors (the weighting factors of 3 and 2 are used to compensate for the fact that there are three green color values but only two blue color values). The result is a representative ratio between the blue color values and the green color values for the center column of pixels. This ratio is used as the target ratio between the vertical blue value for pixel 13 (to be calculated) and the green color value $G_{13}$ for pixel 13. The vertical blue color value for pixel 13 is then derived by multiplying this ratio by the green color value $G_{13}$ for pixel 13.

With regard to the horizontal blue color value for pixel 13, it is noticed that the center row of pixels in which the center pixel 13 is situated does not contain any blue color values (that row contains only red and green color values). Thus, the horizontal blue color value for pixel 13 cannot be derived from these values. However, it is noticed that in the row of pixels on top of and below the center pixel 13, there are blue and green color values. Hence, these color values can be used to calculate the horizontal blue color value for pixel 13. One possible equation for calculating the horizontal blue color value for pixel 13 is shown in Eq. 4.

$$B_h = G_{13} \cdot \frac{1}{2}\left[\frac{2(B_6 + B_8 + B_{10})}{3(G_7 + G_9)} + \frac{2(B_{16} + B_{18} + B_{20})}{3(G_{17} + G_{19})}\right] \quad \text{Eq. 4}$$

In effect, this equation performs the following functions. First, it selects a first set of neighboring pixels situated on one side of the center pixel 13. In this example, the first side is on top of the center pixel 13, and the first set of neighboring pixels is pixels 6, 7, 8, 9, and 10. This set of neighboring pixels comprises a first subset of pixels (pixels 6, 8, and 10) with blue color values $B_6$, $B_8$, and $B_{10}$, and a second subset of pixels (pixels 7 and 9) with green color values $G_7$ and $G_9$. The equation takes the sum of the blue color values $B_6$, $B_8$, and $B_{10}$ and divides it by the sum of the green color values $G_7$ and $G_9$, adjusted by some weighting factors (the weighting factors of 3 and 2 are used to compensate for the fact that there are three blue color values but only two green color values). The result is a first representative ratio between the blue color values and the green color values for the pixels in the first set of neighboring pixels.

The equation also selects a second set of neighboring pixels situated on a second and opposite side of the center pixel 13. In this example, the second and opposite side is below the center pixel 13 and the second set of neighboring pixels is pixels 16, 17, 18, 19, and 20. This set of neighboring pixels comprises a first subset of pixels (pixels 16, 18, and 20) with blue color values $B_{16}$, $B_{18}$, and $B_{20}$, and a second subset of pixels (pixels 17 and 19) with green color values $G_{17}$ and $G_{19}$. The equation takes the sum of the blue color values $B_{16}$, $B_{18}$, and $B_{20}$ and divides it by the sum of the green color values $G_{17}$ and $G_{19}$, adjusted by some weighting factors (the weighting factors of 3 and 2 are used to compensate for the fact that there are three blue color values but only two green color values). The result is a second representative ratio between the blue color values and the green color values for the pixels in second set of neighboring pixels.

The equation then averages the first and second representative ratios and sets this average ratio as the target ratio between the horizontal blue value for pixel 13 (to be calculated) and the green color value $G_{13}$ for pixel 13. The horizontal blue color value for pixel 13 is then derived by multiplying this target ratio by the green color value $G_{13}$ for pixel 13.

In the manner described, the horizontal and vertical blue color values for pixel 13 can be calculated. Once these blue color values are calculated, a desired horizontal-vertical selection scheme is applied, and one or both of the blue color values are used to derive a final and overall blue color value $B_{13}$ (not shown in FIG. 4A) for pixel 13.

Once the red color value and blue color value are calculated for green center pixel 13, the green center pixel 13 is fully demosaiced.

With regard to the pixel arrangement shown in FIG. 4B, a very similar approach can be used to calculate the red and green color values for the green center pixel 13.

To calculate the vertical red color value for pixel 13, the following equation (Eq. 5) can be used.

$$R_v = G_{13} \cdot \frac{3(R_8 + R_{18})}{2(G_3 + G_{13} + G_{23})} \qquad \text{Eq. 5}$$

To calculate the horizontal red color value for pixel 13, the following equation (Eq. 6) can be used.

$$R_h = G_{13} \cdot \frac{1}{2}\left[\frac{2(R_6 + R_8 + R_{10})}{3(G_7 + G_9)} + \frac{2(R_{16} + R_{18} + R_{20})}{3(G_{17} + G_{19})}\right] \qquad \text{Eq. 6}$$

Given the discussion in the previous section, these equations should be self explanatory. Once these red color values are calculated, a desired horizontal-vertical selection scheme is applied, and one or both of the red color values are used to derive a final and overall red color value $R_{13}$ (not shown in FIG. 4B) for pixel 13.

To calculate the horizontal blue color value for pixel 13, the following equation (Eq. 7) can be used.

$$B_h = G_{13} \cdot \frac{3(B_{12} + B_{14})}{2(G_{11} + G_{13} + G_{15})} \qquad \text{Eq. 7}$$

To calculate the vertical blue color value for pixel 13, the following equation (Eq. 8) can be used.

$$B_v = G_{13} \cdot \frac{1}{2}\left[\frac{2(B_2 + B_{12} + B_{22})}{3(G_7 + G_{17})} + \frac{2(B_4 + B_{14} + B_{24})}{3(G_9 + G_{19})}\right] \qquad \text{Eq. 8}$$

Again, given the discussion in the previous sections, these equations should also be self explanatory. Once these blue color values are calculated, a desired horizontal-vertical selection scheme is applied, and one or both of the blue color values are used to derive a final and overall blue color value $B_{13}$ (not shown in FIG. 4B) for pixel 13.

Once the red color value and blue color value are calculated for green center pixel 13, the green center pixel 13 is fully demosaiced.

Calculating Color Values for a Red Pixel

For a red pixel (a pixel for which a red sensed color value is received from the optical sensor array 306), the color values that need to be calculated are the green and blue color values. A red pixel may be found in a matrix of pixels in the arrangement shown in FIG. 4C. In this arrangement, the center red pixel 13 is surrounded by four green pixels and four blue pixels. The following sets forth how the green and blue color values can be calculated for red center pixel 13.

Calculating a Green Color Value

In the arrangement shown in FIG. 4C, it is noticed that there are green color values ($G_{12}$ and $G_{14}$) and red color values ($R_{11}$, $R_{13}$, and $R_{15}$) in the center row of pixels in which the center red pixel 13 is situated. Thus, the horizontal green color value for the red center pixel 13 can be calculated using these color values. One possible equation for calculating the horizontal green color value for pixel 13 is shown in Eq. 9.

$$G_h = R_{13} \cdot \frac{3(G_{12} + G_{14})}{2(R_{11} + R_{13} + R_{15})} \qquad \text{Eq. 9}$$

In effect, this equation takes the sum of the green color values $G_{12}$ and $G_{14}$ and divides it by the sum of the red color values $R_{11}$, $R_{13}$, and $R_{15}$, adjusted by some weighting factors (the weighting factors of 3 and 2 are used to compensate for the fact that there are three red color values but only two green color values). The result is a representative ratio between the green color values and the red color values for the center row of pixels. This ratio is used as the target ratio between the horizontal green value for pixel 13 (to be calculated) and the red color value $R_{13}$ for pixel 13. The horizontal green color value for pixel 13 is then derived by multiplying this ratio by the red color value $R_{13}$ for pixel 13.

With regard to the vertical green color value for pixel 13, it is noticed that there are also green color values ($G_8$ and $G_{18}$) and red color values ($R_3$, $R_{13}$, and $R_{23}$) in the center column of pixels in which the center red pixel 13 is situated. Thus, the vertical green color value for the red center pixel 13 can be calculated using these color values. One possible equation for calculating the vertical green color value for pixel 13 is shown in Eq. 10.

$$G_v = R_{13} \cdot \frac{3(G_8 + G_{18})}{2(R_3 + R_{13} + R_{23})} \qquad \text{Eq. 10}$$

In effect, this equation takes the sum of the green color values $G_8$ and $G_{18}$ and divides it by the sum of the red color values $R_3$, $R_{13}$, and $R_{23}$, adjusted by some weighting factors (the weighting factors of 3 and 2 are used to compensate for the fact that there are three red color values but only two green color values). The result is a representative ratio between the green color values and the red color values for the center column of pixels. This ratio is used as the target ratio between the vertical green value for pixel 13 (to be calculated) and the red color value $R_{13}$ for pixel 13. The vertical green color value for pixel 13 is then derived by multiplying this ratio by the red color value $R_{13}$ for pixel 13.

In the manner described, the horizontal and vertical green color values for pixel 13 can be calculated. Once these green color values are calculated, a desired horizontal-vertical selection scheme is applied, and one or both of the green color values are used to derive a final and overall green color value $G_{13}$ (not shown in FIG. 4C) for pixel 13.

Calculating a Blue Color Value

In one embodiment, to calculate a blue color value for red pixel 13, the sensed red color value $R_{13}$ is not used. Rather, the calculated green color value $G_{13}$, which has just been calculated for pixel 13, is used instead.

With reference to the arrangement shown in FIG. 4C, it is noticed that the center row of pixels in which the center pixel 13 is situated does not contain any blue color values (that row contains only red and green color values). Thus, the horizontal blue color value for pixel 13 cannot be derived from these values. However, it is noticed that in the row of pixels on top of and below the center pixel 13, there are blue and green color values. Hence, these color values can be used to calculate the horizontal blue color value for pixel 13. One possible equation for calculating the horizontal blue color value for pixel 13 is shown in Eq. 11.

$$B_h = G_{13} \cdot \frac{1}{2}\left[\frac{3(B_7 + B_9)}{2(G_6 + G_8 + G_{10})} + \frac{3(B_{17} + B_{19})}{2(G_{16} + G_{18} + G_{20})}\right] \quad \text{Eq. 11}$$

In effect, this equation performs the following functions. First, it selects a first set of neighboring pixels situated on one side of the center pixel 13. In this example, the first side is on top of the center pixel 13, and the first set of neighboring pixels is pixels 6, 7, 8, 9, and 10. This set of neighboring pixels comprises a first subset of pixels (pixels 7 and 9) with blue color values $B_7$ and $B_9$, and a second subset of pixels (pixels 6, 8, and 10) with green color values $G_6$, $G_8$, and $G_{10}$. The equation takes the sum of the blue color values $B_7$ and $B_9$ and divides it by the sum of the green color values $G_6$, $G_8$, and $G_{10}$, adjusted by some weighting factors (the weighting factors of 3 and 2 are used to compensate for the fact that there are three green color values but only two blue color values). The result is a first representative ratio between the blue color values and the green color values for the pixels in the first set of neighboring pixels.

The equation also selects a second set of neighboring pixels situated on a second and opposite side of the center pixel 13. In this example, the second and opposite side is below the center pixel 13 and the second set of neighboring pixels is pixels 16, 17, 18, 19, and 20. This set of neighboring pixels comprises a first subset of pixels (pixels 17 and 19) with blue color values $B_{17}$ and $B_{19}$, and a second subset of pixels (pixels 16, 18, and 20) with green color values $G_{16}$, $G_{18}$, and $G_{20}$. The equation takes the sum of the blue color values $B_{17}$ and $B_{19}$ and divides it by the sum of the green color values $G_{16}$, $G_{18}$, and $G_{20}$, adjusted by some weighting factors (the weighting factors of 3 and 2 are used to compensate for the fact that there are three green color values but only two blue color values). The result is a second representative ratio between the blue color values and the green color values for the pixels in second set of neighboring pixels.

The equation then averages the first and second representative ratios and sets this average ratio as the target ratio between the horizontal blue value for pixel 13 (to be calculated) and the green color value $G_{13}$ (which was previously calculated) for pixel 13. The horizontal blue color value for pixel 13 is then derived by multiplying this target ratio by the green color value $G_{13}$ for pixel 13.

With regard to the vertical blue color value for pixel 13, it is noticed that the center column of pixels in which the center pixel 13 is situated also does not contain any blue color values (that column contains only red and green color values). Thus, the vertical blue color value for pixel 13 cannot be derived from these values. However, it is noticed that in the columns of pixels to the left and right of center pixel 13, there are blue and green color values. Hence, these color values can be used to calculate the vertical blue color value for pixel 13. One possible equation for calculating the vertical blue color value for pixel 13 is shown in Eq. 12.

$$B_v = G_{13} \cdot \frac{1}{2}\left[\frac{3(B_7 + B_{17})}{2(G_2 + G_{12} + G_{22})} + \frac{3(B_9 + B_{19})}{2(G_4 + G_{14} + G_{24})}\right] \quad \text{Eq. 12}$$

In effect, this equation performs the following functions. First, it selects a first set of neighboring pixels situated on one side of the center pixel 13. In this example, the first side is the left side and the first set of neighboring pixels is pixels 2, 7, 12, 17, and 22. This set of neighboring pixels comprises a first subset of pixels (pixels 7 and 17) with blue color values $B_7$ and $B_{17}$, and a second subset of pixels (pixels 2, 12, and 22) with green color values $G_2$, $G_{12}$, and $G_{22}$. The equation takes the sum of the blue color values $B_7$ and $B_{17}$ and divides it by the sum of the green color values $G_2$, $G_{12}$, and $G_{22}$, adjusted by some weighting factors (the weighting factors of 3 and 2 are used to compensate for the fact that there are three green color values but only two blue color values). The result is a first representative ratio between the blue color values and the green color values for the pixels in the first set of neighboring pixels.

The equation also selects a second set of neighboring pixels situated on a second and opposite side of the center pixel 13. In this example, the second and opposite side is the right side and the second set of neighboring pixels is pixels 4, 9, 14, 19, and 24. This set of neighboring pixels comprises a first subset of pixels (pixels 9 and 19) with blue color values $B_9$ and $B_{19}$, and a second subset of pixels (pixels 4, 14, and 24) with green color values $G_4$, $G_{14}$, and $G_{24}$. The equation takes the sum of the blue color values $B_9$ and $B_{19}$ and divides it by the sum of the green color values $G_4$, $G_{14}$, and $G_{24}$, adjusted by some weighting factors (the weighting factors of 3 and 2 are used to compensate for the fact that there are three green color values but only two blue color values). The result is a second representative ratio between the blue color values and the green color values for the pixels in the second set of neighboring pixels.

The equation then averages the first and second representative ratios and sets this average ratio as the target ratio between the vertical blue value for pixel 13 (to be calculated) and the calculated green color value $G_{13}$ for pixel 13. The vertical blue color value for pixel 13 is then derived by multiplying this target ratio by the green color value $G_{13}$ for pixel 13.

In the manner described, the horizontal and vertical blue color values for pixel 13 can be calculated. Once these blue color values are calculated, a desired horizontal-vertical selection scheme is applied, and one or both of the blue color values are used to derive a final and overall blue color value $B_{13}$ (not shown in FIG. 4A) for pixel 13.

Once the green color value and blue color value are calculated for red center pixel 13, the red center pixel 13 is fully demosaiced.

Calculating Color Values for a Blue Pixel

For a blue pixel (a pixel for which a blue sensed color value is received from the optical sensor array 306), the color values that need to be calculated are the green and red color values. A blue pixel may be found in a matrix of pixels in the arrangement shown in FIG. 4D. In this arrangement, the center blue pixel 13 is surrounded by four green pixels and four red pixels. The following sets forth how the green and red color values can be calculated for blue center pixel 13.

Calculating a Green Color Value

In the arrangement shown in FIG. 4D, it is noted that there are green color values ($G_{12}$ and $G_{14}$) and blue color values ($B_{11}$, $B_{13}$, and $B_{15}$) in the center row of pixels in which the center blue pixel 13 is situated. Thus, the horizontal green color value for the blue center pixel 13 can be calculated using these color values. One possible equation for calculating the horizontal green color value for pixel 13 is shown in Eq. 13.

$$G_h = B_{13} \cdot \frac{3(G_{12} + G_{14})}{2(B_{11} + B_{13} + B_{15})} \qquad \text{Eq. 13}$$

In effect, this equation takes the sum of the green color values $G_{12}$ and $G_{14}$ and divides it by the sum of the blue color values $B_{11}$, $B_{13}$, and $B_{15}$, adjusted by some weighting factors (the weighting factors of 3 and 2 are used to compensate for the fact that there are three blue color values but only two green color values). The result is a representative ratio between the green color values and the blue color values for the center row of pixels. This ratio is used as the target ratio between the horizontal green value for pixel 13 (to be calculated) and the blue color value $B_{13}$ for pixel 13. The horizontal green color value for pixel 13 is then derived by multiplying this ratio by the blue color value $B_{13}$ for pixel 13.

With regard to the vertical green color value for pixel 13, it is noted that there are also green color values ($G_8$ and $G_{18}$) and blue color values ($B_3$, $B_{13}$, and $B_{23}$) in the center column of pixels in which the center blue pixel 13 is situated. Thus, the vertical green color value for the blue center pixel 13 can be calculated using these color values. One possible equation for calculating the vertical green color value for pixel 13 is shown in Eq. 14.

$$G_v = B_{13} \cdot \frac{3(G_8 + G_{18})}{2(B_3 + B_{13} + B_{23})} \qquad \text{Eq. 14}$$

In effect, this equation takes the sum of the green color values $G_8$ and $G_{18}$ and divides it by the sum of the blue color values $B_3$, $B_{13}$, and $B_{23}$, adjusted by some weighting factors (the weighting factors of 3 and 2 are used to compensate for the fact that there are three blue color values but only two green color values). The result is a representative ratio between the green color values and the blue color values for the center column of pixels. This ratio is used as the target ratio between the vertical green value for pixel 13 (to be calculated) and the blue color value $B_{13}$ for pixel 13. The vertical green color value for pixel 13 is then derived by multiplying this ratio by the blue color value $B_{13}$ for pixel 13.

In the manner described, the horizontal and vertical green color values for pixel 13 can be calculated. Once these green color values are calculated, a desired horizontal-vertical selection scheme is applied, and one or both of the green color values are used to derive a final and overall green color value $G_{13}$ (not shown in FIG. 4D) for pixel 13.

Calculating a Red Color Value

In one embodiment, to calculate a red color value for blue pixel 13, the sensed blue color value $B_{13}$ is not used. Rather, the calculated green color value $G_{13}$, which has just been calculated for pixel 13, is used instead.

With reference to the arrangement shown in FIG. 4D, it is noticed that the center row of pixels in which the center pixel 13 is situated does not contain any red color values (that row contains only blue and green color values). Thus, the horizontal red color value for pixel 13 cannot be derived from these values. However, it is noticed that in the row of pixels on top of and below the center pixel 13, there are red and green color values. Hence, these color values can be used to calculate the horizontal red color value for pixel 13. One possible equation for calculating the horizontal red color value for pixel 13 is shown in Eq. 15.

$$R_h = G_{13} \cdot \frac{1}{2}\left[\frac{3(R_7 + R_9)}{2(G_6 + G_8 + G_{10})} + \frac{3(R_{17} + R_{19})}{2(G_{16} + G_{18} + G_{20})}\right] \qquad \text{Eq. 15}$$

In effect, this equation performs the following functions. First, it selects a first set of neighboring pixels situated on one side of the center pixel 13. In this example, the first side is on top of the center pixel 13, and the first set of neighboring pixels is pixels 6, 7, 8, 9, and 10. This set of neighboring pixels comprises a first subset of pixels (pixels 7 and 9) with red color values $R_7$ and $R_9$, and a second subset of pixels (pixels 6, 8, and 10) with green color values $G_6$, $G_8$, and $G_{10}$. The equation takes the sum of the red color values $R_7$ and $R_9$ and divides it by the sum of the green color values $G_6$, $G_8$, and $G_{10}$, adjusted by some weighting factors (the weighting factors of 3 and 2 are used to compensate for the fact that there are three green color values but only two red color values). The result is a first representative ratio between the red color values and the green color values for the pixels in the first set of neighboring pixels.

The equation also selects a second set of neighboring pixels situated on a second and opposite side of the center pixel 13. In this example, the second and opposite side is below the center pixel 13 and the second set of neighboring pixels is pixels 16, 17, 18, 19, and 20. This set of neighboring pixels comprises a first subset of pixels (pixels 17 and 19) with red color values $R_{17}$ and $R_{19}$, and a second subset of pixels (pixels 16, 18, and 20) with green color values $G_{16}$, $G_{18}$, and $G_{20}$. The equation takes the sum of the red color values $R_{17}$ and $R_{19}$ and divides it by the sum of the green color values $G_{16}$, $G_{18}$, and $G_{20}$, adjusted by some weighting factors (the weighting factors of 3 and 2 are used to compensate for the fact that there are three green color values but only two red color values). The result is a second representative ratio between the red color values and the green color values for the pixels in the second set of neighboring pixels.

The equation then averages the first and second representative ratios and sets this average ratio as the target ratio between the horizontal red value for pixel 13 (to be calculated) and the calculated green color value $G_{13}$ (which was previously calculated) for pixel 13. The horizontal red color value for pixel 13 is then derived by multiplying this target ratio by the calculated green color value $G_{13}$ for pixel 13.

With regard to the vertical red color value for pixel 13, it is noticed that the center column of pixels in which the center pixel 13 is situated also does not contain any red color values (that column contains only blue and green color values). Thus, the vertical red color value for pixel 13 cannot be derived from these values. However, it is noticed that in the columns of pixels to the left and right of center pixel 13, there are red and green color values. Hence, these color values can be used to calculate the vertical red color value for pixel 13. One possible equation for calculating the vertical red color value for pixel 13 is shown in Eq. 16.

$$R_v = G_{13} \cdot \frac{1}{2}\left[\frac{3(R_7 + R_{17})}{2(G_2 + G_{12} + G_{22})} + \frac{3(R_9 + R_{19})}{2(G_4 + G_{14} + G_{24})}\right] \quad \text{Eq. 16}$$

In effect, this equation performs the following functions. First, it selects a first set of neighboring pixels situated on one side of the center pixel 13. In this example, the first side is the left side and the first set of neighboring pixels is pixels 2, 7, 12, 17, and 22. This set of neighboring pixels comprises a first subset of pixels (pixels 7 and 17) with red color values $R_7$ and $R_{17}$, and a second subset of pixels (pixels 2, 12, and 22) with green color values $G_2$, $G_{12}$, and $G_{22}$. The equation takes the sum of the red color values $R_7$ and $R_{17}$ and divides it by the sum of the green color values $G_2$, $G_{12}$, and $G_{22}$, adjusted by some weighting factors (the weighting factors of 3 and 2 are used to compensate for the fact that there are three green color values but only two red color values). The result is a first representative ratio between the red color values and the green color values for the pixels in the first set of neighboring pixels.

The equation also selects a second set of neighboring pixels situated on a second and opposite side of the center pixel 13. In this example, the second and opposite side is the right side and the second set of neighboring pixels is pixels 4, 9, 14, 19, and 24. This set of neighboring pixels comprises a first subset of pixels (pixels 9 and 19) with red color values $R_9$ and $R_{19}$, and a second subset of pixels (pixels 4, 14, and 24) with green color values $G_4$, $G_{14}$, and $G_{24}$. The equation takes the sum of the red color values $R_9$ and $R_{19}$ and divides it by the sum of the green color values $G_4$, $G_{14}$, and $G_{24}$, adjusted by some weighting factors (the weighting factors of 3 and 2 are used to compensate for the fact that there are three green color values but only two red color values). The result is a second representative ratio between the red color values and the green color values for the pixels in second set of neighboring pixels.

The equation then averages the first and second representative ratios and sets this average ratio as the target ratio between the vertical red value for pixel 13 (to be calculated) and the calculated green color value $G_{13}$ for pixel 13. The vertical red color value for pixel 13 is then derived by multiplying this target ratio by the calculated green color value $G_{13}$ for pixel 13.

In the manner described, the horizontal and vertical red color values for pixel 13 can be calculated. Once these red color values are calculated, a desired horizontal-vertical selection scheme is applied, and one or both of the red color values are used to derive a final and overall red color value $R_{13}$ (not shown in FIG. 4D) for pixel 13.

Once the green color value and red color value are calculated for blue center pixel 13, the blue center pixel 13 is fully demosaiced.

Generalizations

For purposes of illustration, and to foster a complete understanding of the present invention, the previous examples have been described with a fair amount of specificity. However, it should be noted that the scope of the present invention should not be limited by such illustrations. Rather, numerous changes and adjustments can be made within the scope of the present invention.

For instance, the previous examples show that the neighboring pixels may be to the left or the right of the particular pixel, or they may be on top of or below the particular pixel. Thus, the "sides" of the particular pixel are left, right, on top of, and below. It should be noted that, if so desired, the sides may also be taken along a diagonal line of pixels. For example, with reference to FIG. 4A, the diagonal line may be the line of pixels including pixels 5, 9, 13, 17, and 21. In such a case, the neighboring pixels on a first side of the particular pixel (center pixel 13) may include pixels 1, 2, 3, 4, 6, 7, 8, 11, 12, and 16, and the neighboring pixels on the opposite side of the particular pixel may include pixels 10, 14, 15, 18, 19, 20, 22, 23, 24, and 25. Thus, the neighboring pixels may be divided into different sides of the particular pixel based upon any desired line of pixels that includes the particular pixel.

Also, in the above examples, when representative ratios are determined for sets of neighboring pixels on opposite sides of the particular pixel, the color values of the pixels between the two sides are not used. For example, in equation 2 (which refers to FIG. 4A), when the representative ratio for the neighboring pixels 2, 7, 12, 17, and 22 on the left side of the center pixel 13 is determined, the green pixel values $G_3$, $G_{13}$, and $G_{23}$ in the center column are not used. Likewise, when the representative ratio for the neighboring pixels 4, 9, 14, 19, and 24 on the right side of the center pixel 13 is determined, the green pixel values $G_3$, $G_{13}$, and $G_{23}$ in the center column are again not used. This is one possible embodiment. In other embodiments, one or more of these color values between the two sides may be used in determining the first and/or second representative ratios. This and other modifications are within the scope of the present invention.

Also, in the examples above, five color values from a single line of pixels are used to determine each representative ratio. This is not required. If so desired, more or fewer color values from a line of pixels may be used for each ratio, and color values from more than one line of pixels may be used for each ratio. Furthermore, a matrix of pixels larger or smaller than a 5×5 matrix may be used. These and other modifications are within the scope of the invention.

In addition, specific equations are provided for determining the ratios. These exact equations need not be used. Rather, numerous adjustments may be made to the equations without departing from the scope of the invention. For example, the weighting factors may be changed to favor some color values more than others. Also, the grouping of the numerator and denominator values may be changed and/or even separated. For example, rather than summing all of the values of one color and dividing by the sum of all of the values of another color, the values of the different colors may be separated into subsets, and a ratio may be calculated for each different subset and summed together to get an overall ratio. For example, rather than calculating a ratio using an expression like (a+b+c)/(d+e), the ratio may be calculated using an expression like a/d+2b/(d+e)+c/e. This and other equations may be used to calculate the representative ratios.

Furthermore, the target ratio is disclosed as being the average of the first and second representative ratios. This is not required. Rather, any methodology may be used to determine the target ratio based upon the first and second representative ratios. In one embodiment, a desired result is to set the target ratio between the first and second representative ratios.

Overall, many modifications may be made by those of ordinary skill in the art with the benefit of this disclosure without departing from the scope of the invention. Therefore, the invention should not be limited by the specific examples used to illustrate it but only by the scope of the issued claims and the equivalents thereof.

Sample Computing Device

Figure 5:
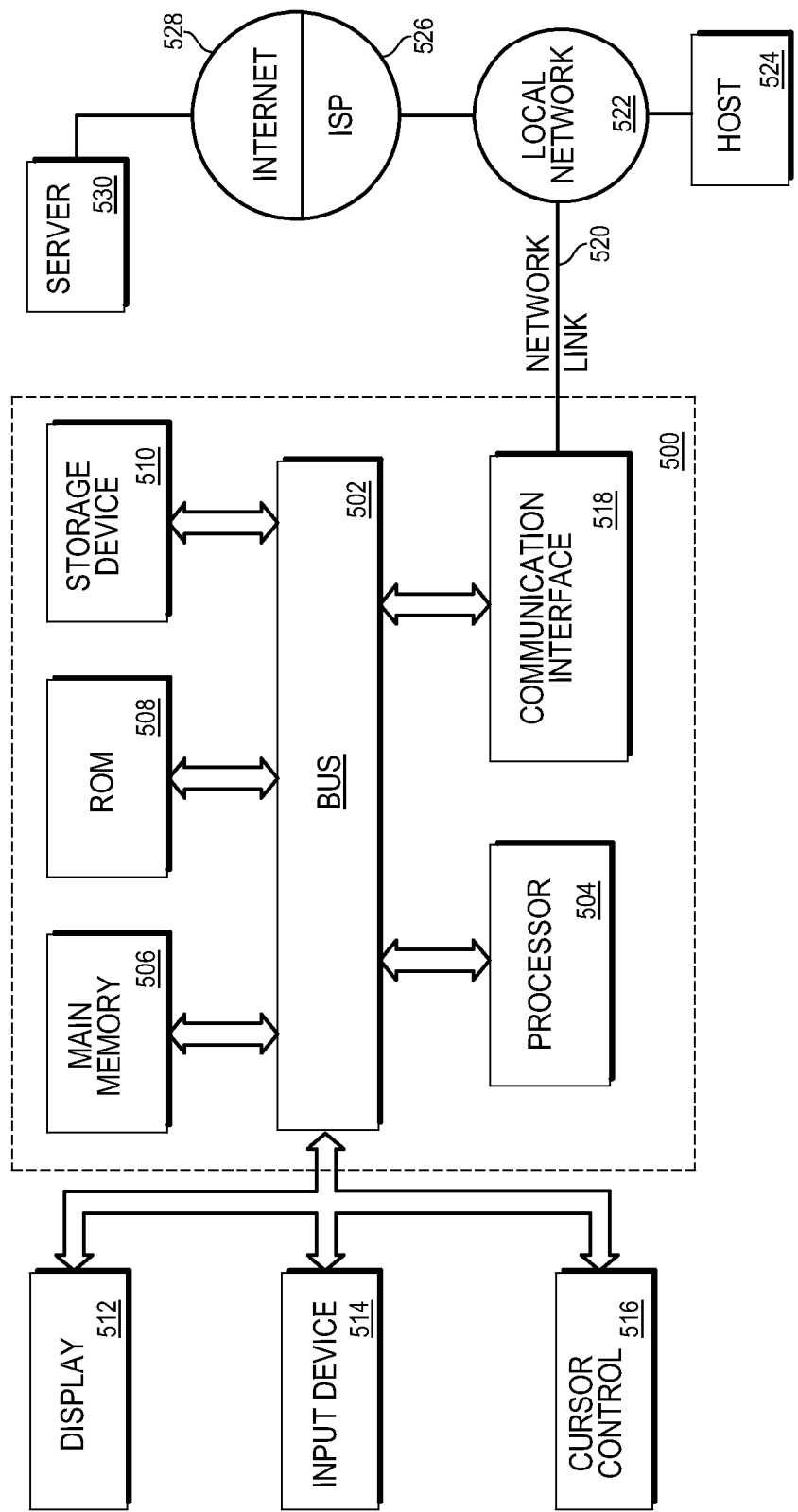
FIG. 5 is a block diagram of a sample computer system in which one embodiment of the present invention may be implemented.

FIG. 5 shows a block diagram of a computer system 500 in which a software implementation of the present invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. One or more input devices 514 may also be coupled to bus 502 for communicating information and input to processor 504. An input device 514 may be a keyboard/keypad having alphanumeric and other keys. An input device 514 may also be the apparatus shown in FIG. 3 for providing captured/processed image information to processor 504. A cursor control device 516, such as a mouse, a trackball, or cursor direction keys may also be coupled to bus 502 for communicating direction information and command selections to processor 504 and for controlling cursor movement on display 512. This cursor control device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

An embodiment of the invention uses computer system 500 for implementing the technique described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable storage medium" as used herein refers to any storage medium that participates in providing data that causes a machine to operation in a specific fashion. In an embodiment implemented using computer system 500, various machine-readable storage media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other storage medium from which a computer can read.

Various forms of machine-readable storage media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

What is claimed is:

1. For a particular pixel in a matrix of pixels, the particular pixel having a value for a first color but not for a second color, a machine implemented method for calculating a value for the second color for the particular pixel, comprising:

selecting a first set of neighboring pixels that are situated on a first side of the particular pixel, the first set of neighboring pixels comprising a first subset of pixels having one or more values for the first color and a second subset of pixels having one or more values for the second color;

based upon the one or more values for the first color from the first subset of pixels and the one or more values for the second color from the second subset of pixels, determining a first representative relationship between values for the second color and values for the first color for the first set of neighboring pixels;

selecting a second set of neighboring pixels that are situated on a second side of the particular pixel which is opposite the first side, the second set of neighboring pixels comprising a third subset of pixels having one or more values for the first color and a fourth subset of pixels having one or more values for the second color;

based upon the one or more values for the first color from the third subset of pixels and the one or more values for the second color from the fourth subset of pixels, determining a second representative relationship between values for the second color and values for the first color for the second set of neighboring pixels;

based upon the first and second representative relationships, determining a target relationship between the value for the second color for the particular pixel and the value for the first color for the particular pixel; and based upon the target relationship and the value for the first color for the particular pixel, calculating the value for the second color for the particular pixel.

2. The method of claim 1, wherein the first representative relationship and the second representative relationship are separate relationships that are determined separately.

3. The method of claim 2, wherein the matrix of pixels has a line of pixels, including the particular pixel, that is situated between the first side of the particular pixel and the second side of the particular pixel, and wherein the first and second representative relationships are determined without using any color values from any of the pixels in the line of pixels situated between the first side of the particular pixel and the second side of the particular pixel.

4. The method of claim 2, wherein the first representative relationship indicates a first representative ratio between values for the second color and values for the first color for the first set of neighboring pixels, and wherein the second representative relationship indicates a second representative ratio between values for the second color and values for the first color for the second set of neighboring pixels.

5. The method of claim 4, wherein the target relationship indicates a target ratio between the value for the second color for the particular pixel and the value for the first color for the particular pixel, and wherein the target ratio is determined based upon the first and second representative ratios such that the target ratio is between the first representative ratio and the second representative ratio.

6. The method of claim 5, wherein the value for the second color for the particular pixel is calculated such that the value for the second color for the particular pixel and the value for the first color for the particular pixel satisfy the target ratio.

7. The method of claim 1, wherein the particular pixel has a sensed value for a third color, and wherein the method further comprises:

based at least partially upon the sensed value for the third color for the particular pixel, calculating the value for the first color for the particular pixel.

8. A device having a plurality of logic elements wherein the logic elements are configured to perform the following operations:

for a particular pixel in a matrix of pixels, the particular pixel having a value for a first color but not for a second color, calculating a value for the second color for the particular pixel, by:

selecting a first set of neighboring pixels that are situated on a first side of the particular pixel, the first set of neighboring pixels comprising a first subset of pixels having one or more values for the first color and a second subset of pixels having one or more values for the second color;

based upon the one or more values for the first color from the first subset of pixels and the one or more values for the second color from the second subset of pixels, determining a first representative relationship between values for the second color and values for the first color for the first set of neighboring pixels;

selecting a second set of neighboring pixels that are situated on a second side of the particular pixel which is opposite the first side, the second set of neighboring pixels comprising a third subset of pixels having one or more values for the first color and a fourth subset of pixels having one or more values for the second color;

based upon the one or more values for the first color from the third subset of pixels and the one or more values for the second color from the fourth subset of pixels, determining a second representative relationship between values for the second color and values for the first color for the second set of neighboring pixels;

based upon the first and second representative relationships, determining a target relationship between the value for the second color for the particular pixel and the value for the first color for the particular pixel; and based upon the target relationship and the value for the first color for the particular pixel, calculating the value for the second color for the particular pixel.

9. The device of claim 8, wherein the first representative relationship and the second representative relationship are separate relationships that are determined separately.

10. The device of claim 9, wherein the matrix of pixels has a line of pixels, including the particular pixel, that is situated between the first side of the particular pixel and the second side of the particular pixel, and wherein the first and second representative relationships are determined without using any color values from any of the pixels in the line of pixels situated between the first side of the particular pixel and the second side of the particular pixel.

11. The device of claim 9, wherein the first representative relationship indicates a first representative ratio between values for the second color and values for the first color for the first set of neighboring pixels, and wherein the second representative relationship indicates a second representative ratio between values for the second color and values for the first color for the second set of neighboring pixels.

12. The device of claim 11, wherein the target relationship indicates a target ratio between the value for the second color for the particular pixel and the value for the first color for the particular pixel, and wherein the target ratio is determined based upon the first and second representative ratios such that the target ratio is between the first representative ratio and the second representative ratio.

13. The device of claim 12, wherein the value for the second color for the particular pixel is calculated such that the value for the second color for the particular pixel and the value for the first color for the particular pixel satisfy the target ratio.

14. The device of claim 8, wherein the particular pixel has a sensed value for a third color, and wherein the logic elements of the device are configured to further perform the operation of:
based at least partially upon the sensed value for the third color for the particular pixel, calculating the value for the first color for the particular pixel.

15. The device of claim 8, wherein the device is a mobile communication device.

16. A machine readable storage medium storing instructions which, when executed by one or more processors, cause the one or more processors to perform the operations of:
for a particular pixel in a matrix of pixels, the particular pixel having a value for a first color but not for a second color, calculating a value for the second color for the particular pixel by:
selecting a first set of neighboring pixels that are situated on a first side of the particular pixel, the first set of neighboring pixels comprising a first subset of pixels having one or more values for the first color and a second subset of pixels having one or more values for the second color;
based upon the one or more values for the first color from the first subset of pixels and the one or more values for the second color from the second subset of pixels, determining a first representative relationship between values for the second color and values for the first color for the first set of neighboring pixels;
selecting a second set of neighboring pixels that are situated on a second side of the particular pixel which is opposite the first side, the second set of neighboring pixels comprising a third subset of pixels having one or more values for the first color and a fourth subset of pixels having one or more values for the second color;
based upon the one or more values for the first color from the third subset of pixels and the one or more values for the second color from the fourth subset of pixels, determining a second representative relationship between values for the second color and values for the first color for the second set of neighboring pixels;
based upon the first and second representative relationships, determining a target relationship between the value for the second color for the particular pixel and the value for the first color for the particular pixel; and
based upon the target relationship and the value for the first color for the particular pixel, calculating the value for the second color for the particular pixel.

17. The machine readable storage medium of claim 16, wherein the first representative relationship and the second representative relationship are separate relationships that are determined separately.

18. The machine readable storage medium of claim 17, wherein the matrix of pixels has a line of pixels, including the particular pixel, that is situated between the first side of the particular pixel and the second side of the particular pixel, and wherein the first and second representative relationships are determined without using any color values from any of the pixels in the line of pixels situated between the first side of the particular pixel and the second side of the particular pixel.

19. The machine readable storage medium of claim 17, wherein the first representative relationship indicates a first representative ratio between values for the second color and values for the first color for the first set of neighboring pixels, and wherein the second representative relationship indicates a second representative ratio between values for the second color and values for the first color for the second set of neighboring pixels.

20. The machine readable storage medium of claim 19, wherein the target relationship indicates a target ratio between the value for the second color for the particular pixel and the value for the first color for the particular pixel, and wherein the target ratio is determined based upon the first and second representative ratios such that the target ratio is between the first representative ratio and the second representative ratio.

21. The machine readable storage medium of claim 20, wherein the value for the second color for the particular pixel is calculated such that the value for the second color for the particular pixel and the value for the first color for the particular pixel satisfy the target ratio.

22. The machine readable storage medium of claim 16, wherein the particular pixel has a sensed value for a third color, and wherein the instructions cause the one or more processor to further perform the operation of:
based at least partially upon the sensed value for the third color for the particular pixel, calculating the value for the first color for the particular pixel.

* * * * *